United States Patent
Zhou et al.

(10) Patent No.: US 7,283,140 B2
(45) Date of Patent: Oct. 16, 2007

(54) TEXTURE MONTAGE

(75) Inventors: Kun Zhou, Beijing (CN); Xi Wang, Beijing (CN); Baining Guo, Beijing (CN); Heung-Yeung Shum, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 353 days.

(21) Appl. No.: 11/157,657

(22) Filed: Jun. 21, 2005

(65) Prior Publication Data

US 2006/0284880 A1 Dec. 21, 2006

(51) Int. Cl.
*G09G 5/00* (2006.01)
*G06K 9/36* (2006.01)
*G06T 15/00* (2006.01)
*G06T 15/30* (2006.01)

(52) U.S. Cl. .................... 345/582; 345/419; 345/423; 345/581; 345/619; 382/285

(58) Field of Classification Search ........ 345/418–423, 345/428, 581–584, 589, 594, 618–619, 549, 345/552; 382/282, 285
See application file for complete search history.

(56) References Cited

U.S. PATENT DOCUMENTS

| 2005/0128211 A1* | 6/2005 | Berger et al. ............... 345/582 |
| 2005/0280656 A1* | 12/2005 | Maillot ...................... 345/606 |
| 2005/0285550 A1* | 12/2005 | Simons et al. ............. 318/135 |
| 2006/0170695 A1* | 8/2006 | Zhou et al. ................. 345/582 |

* cited by examiner

*Primary Examiner*—Wesner Sajous
(74) *Attorney, Agent, or Firm*—Lee & Hayes, PLLC

(57) ABSTRACT

Texture montage is described. In one aspect, feature correspondences are received. The feature correspondences map at least one region on a 3-D mesh to at least one region on an image of one or more images. Each of the images provides texture information. An atlas of texture patches is created based on the feature correspondences. The atlas of texture patches provides for rendering texture from the images onto the 3-D mesh.

20 Claims, 8 Drawing Sheets

TEXTURE MONTAGE

BACKGROUND

Texture mapping is used in computer graphics as a way to enhance the visual richness of a three-dimensional (3-D) surface. For example, texture mapping is often used to enhance computer graphics from overly simplified character meshes in game engines, to complex digital models in computer-generated feature films. Seamlessly mapping multiple synthesized and/or real-life textures onto 3-D models for surface decoration, with little visual distortion, can be very difficult and labor-intensive to accomplish by hand, or otherwise. For example, seamlessly mapping a series of real-life photos onto a 3-D model requires alignment of the features of the texture images and the models. Such alignment requires an impractical amount of manual work to put dense constraints along patch boundaries. Additionally, even if boundary continuity is somehow provided, the number of correspondences required to guarantee that each triangle of the original domain has corresponding texture coordinates in a texture image can be arbitrarily large for meshes of high genus, making conventional texture mapping techniques, once again, impractical for a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, Texture montage is described. In one aspect, feature correspondences are received. The feature correspondences map at least one region on a 3-D mesh to at least one region on an image of one or more images. Each of the images provides texture information. An atlas of texture patches is created based on the feature correspondences. The atlas of texture patches provides for rendering texture from the images onto the 3-D mesh.

BRIEF DESCRIPTION OF THE DRAWINGS

In the Figures, the left-most digit of a component reference number identifies the particular Figure ("FIG.") in which the component first appears.

DETAILED DESCRIPTION

Overview

The systems and methods for texture montage use one or more images providing texture information to reduce the amount of time typically needed to seamlessly decorate a 3-D model with texture. More particularly, texture montage decorates a 3-D model from a set of digital or man-made images of a given subject under various points of view, or of different subjects, combining parts of these images to create a "composite" texture. This is accomplished independent of any need to cut the 3-D model in patches or painstakingly ensure continuity across textured regions. This makes texturing a 3-D model as simple as creating a photomontage, except that the 3-D model is decorated with a texture montage. To these ends, texture montage automatically, and substantially simultaneously, partitions a 3-D mesh and one or more texture images as a function of an arbitrarily sized set of user-specified feature correspondences. Texture montage utilizes a content-based measure of texture mismatch across patch boundaries and an interleaved texture-coordinate optimization algorithm to minimize any texture mismatch, while optimizing geometric distortion. Texture montage also implements surface texture inpainting operations to smoothly-fill in any remaining non-textured regions on the surface of the 3-D mesh.

These and other aspects of texture montage are now described in greater detail.

An Exemplary System

Although not required, texture montage is described in the general context of computer-executable instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
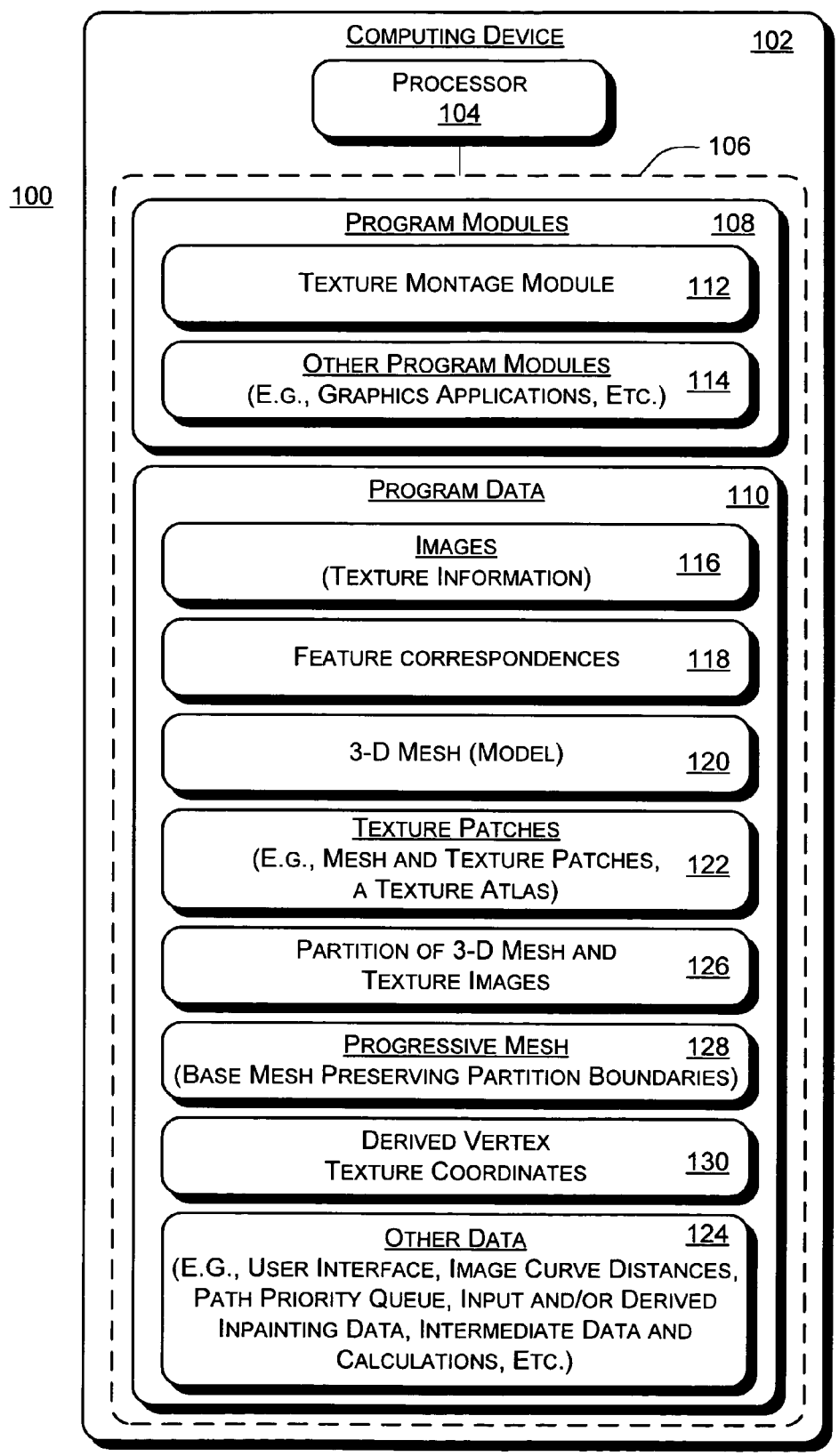
FIG. 1 shows an exemplary system to implement texture montage.

FIG. 1 shows an exemplary system 100 to implement texture montage. System 100 includes a general-purpose computing device 102. Computing device 102 represents any type of computing device such as a personal computer, a laptop, a server, handheld or mobile computing device (e.g., a cellular phone, personal digital assistant), and/or so on. Computing device 102 includes a processor 104 coupled to a computer-readable medium or media 106. Computer-readable media 106 can be any available media accessible by computing device 102, including both volatile and non-volatile media (e.g., read only memory (ROM) and random access memory (RAM)), removable and non-removable media. A RAM portion of computer-readable media 106 includes program modules and program data that are immediately accessible to and/or presently being operated on by processor 104.

By way of example and not limitation, computer-readable media 106 includes program modules 108 and program data 110. Program modules 108 include, for example, texture montage module 112 and other program modules 114, such as a graphics application that utilizes the seamless texture mapping features of texture montage module 112. Texture montage module ("texture montage") 112 utilizes a set of images 116 and feature correspondences 118 between the images 116 and an arbitrary 3-D mesh 120 (i.e., a 3-D model), to create and map texture patches 122 onto the 3-D mesh 120.

Images 116 are digital images such as photos, Web images, etc. In this implementation, if there is any useless background region in an image 116, or if there is any exposure or color mismatch across respective ones of the images 116, the image(s) 116 are preprocessed to remove any useless background region and to correct any exposure and/or color mismatch. Conventional image cut out tools and image-processing applications are used to respectively remove any useless background from an image and correct any exposure or color mismatch across the images. In this manner, and in one implementation, images 116 are preprocessed such that the each pixel in an image 116 is an alpha value ranging from zero to one; zero values are assigned only to background pixels. For each pixel in the image 116, the distance to the nearest non-background pixel is stored as image data associated with the image 116. (As described below in the section titled "Exemplary Mesh Partitioning by Mesh-Texture Matching", texture montage 112 utilizes this pre-computed distance to evaluate the validity of image paths after the 3-D mesh 120 has been partitioned).

In one implementation, system 100 presents a user interface (UI) showing 3-D mesh 120 and images 116 (e.g., the UI shows low-resolution versions of the images). The UI allows a user to select and correlate regions of the 3-D mesh 120 with specific regions on one or more of the images 116, and thereby facilitate creation of feature correspondences 118. Such a UI is shown as a respective portion of "other data" 124. Each feature correspondence 118 constrains a particular vertex on the 3-D mesh 120 to a respective point on a particular image 116. The set of feature correspondences 118 can be of any arbitrary size. In general, a user specifies feature correspondences by specifying feature polygons along the contour of the 3-D mesh 120 and corresponding image(s) 116. The user identifies features for alignment. Features for alignment include, for example, an eye, nose, ankle, etc.

For example, to create feature correspondences 118, a user first defines a particular region on the 3-D mesh 120 that the user wants to map to a particular region on one of the images 116. In this implementation, the user specifies a region on the 3-D mesh 120, for example, by placing a pointing device such as a mouse over a particular part of the 3-D mesh 120. The user directs texture montage 112 to create a vertex with coordinates of a selected point by pressing the mouse button at that particular point. By iteratively creating respective vertices on the 3-D mesh 120, the user defines an enclosed region on the 3-D mesh 120.

In one implementation, if a same feature point on surface 120 correlates to respective features in multiple images 116, a user specifies the feature point across at least a subset or all of the multiple images 116. This precisely matches the image features across the 3-D mesh 120 and corresponding ones of the images 116.

Figure 2:
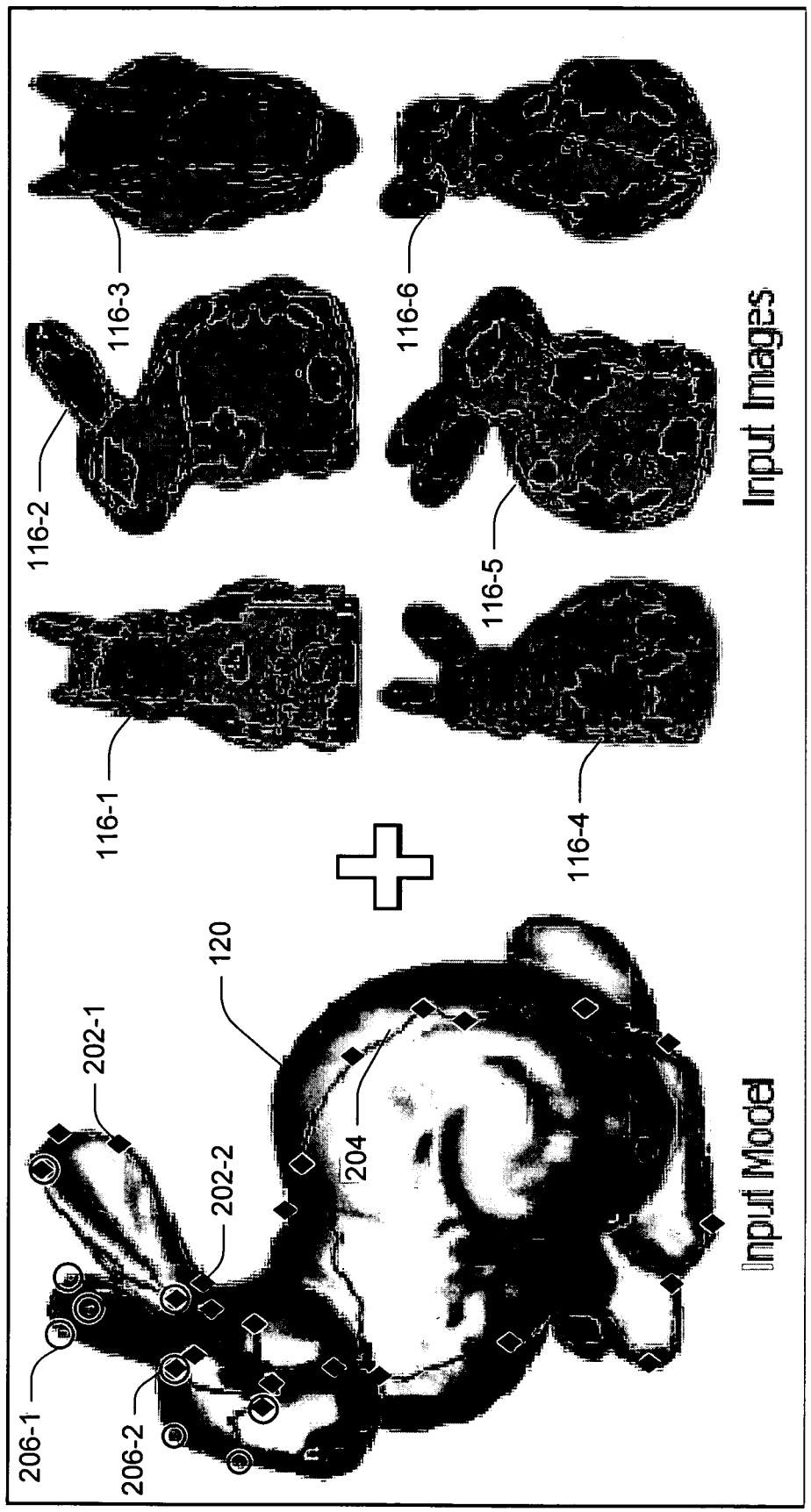
FIG. 2 shows exemplary feature correspondences between a 3-D mesh and a set of images providing texture information (i.e., texture images).

FIG. 2 shows exemplary feature correspondences 118 between a 3-D mesh 120 and a set of images 116. For purposes of exemplary illustration, the operations of the procedure are described in reference to the components of FIG. 1. In the figures, the left-most digit of a component reference number identifies the particular figure in which the component first appears. Referring to FIG. 2, the user has specified a first region. In this example, the first region is delimited by diamond-shaped vertices 202 (e.g., 202-1, 202-2, etc.) to differentiate the first region from any other regions. As the user specifies vertices (or after the user has completed specification of an entire region), texture montage 112 connects sequential ones of the vertices with lines (e.g., lines 204) that follow contours of the 3-D mesh 120. These lines facilitate differentiation of regions from one another. Such differentiation is described in greater detail below in the section titled "Exemplary Mesh Partitioning by Mesh-Texture Matching."

A user maps a region defined on a 3-D mesh 120 to the desired texture of one of the images 116. To this end, the user creates vertices on one of the images 116 to define a region of texture on the image 116 that the user wants texture montage 112 to render over the corresponding region on the 3-D mesh 120. The vertices on respective ones of the images 116 are shown as respective dots. Each vertex is also shown with one or more interconnecting contour lines. The vertices of a particular region (defined on an image 116) being mapped by the user to a respective region on the 3-D mesh 120, do not have to exactly correlate in number and/or in position with the vertices on the 3-D mesh 120. Texture montage 112 calculates the features correspondences 118 between the two regions based on the user defined vertices, which can be as sparse or as dense as the user desires.

In this implementation, feature correspondences 118 are specified one by one. For example, once a region is defined on the 3D mesh, the user defines its corresponding region in the 2D image 116. For example, once respective regions on the 3-D mesh 120 and on an image 116 have been delineated, the user selects one of the newly defined regions (e.g., via a mouse or other type of selection) and then right-clicks over the other delineated region to select a drop-down menu item directing texture montage 112. The drop-down menu item selection generates the feature correspondences 118 that map to the selected regions on the 3-D mesh 120 and the region on an image 116.

Figure 3:
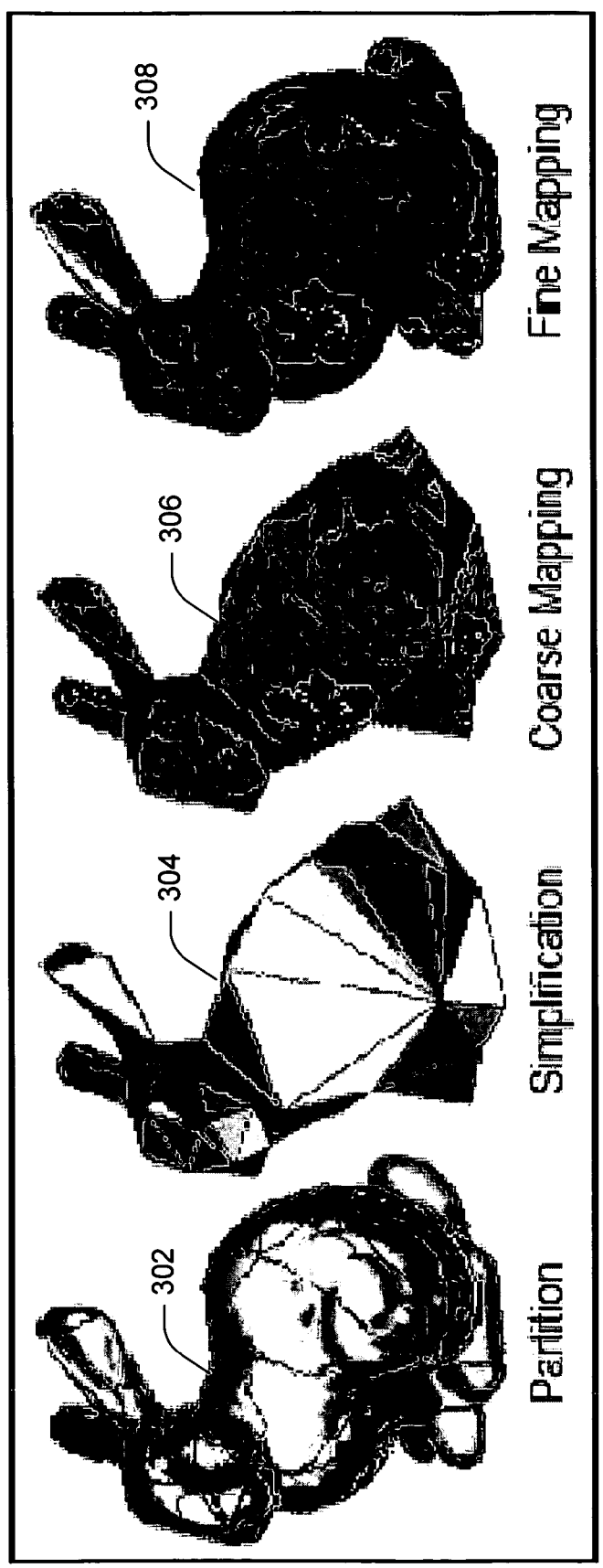
FIG. 3 shows exemplary results of texture montage operations in view of identified feature correspondences between a 3-D mesh and one or more texture images.

FIG. 3 shows exemplary results of texture montage operations. In particular, image 302 shows exemplary results of mesh partitioning operations. Image 304 shows exemplary results of progressive mesh creation. Image 306 shows exemplary results of base mesh and coarse texture mapping. Image 308 shows exemplary results of coarse-to-fine map construction operations.

Operations of texture montage 112 are now described in greater detail.

Exemplary Mesh Partitioning by Mesh-Texture Matching

In view of feature correspondences 118, texture montage 112 automatically partitions the 3-D mesh 120 and the images 116 to create a set 3-D mesh surface triangle texture coordinates (i.e., partition of 3-D mesh and texture images 126, or "partition 126"). To this end, texture montage 112 identifies a set of path-curve pairs corresponding to feature lines and polygons on the mesh 120 and the images 116. A "path" is denoted with a polyline (i.e., sequence of vertices) traced on a mesh 120, while the term "curve" describes a polyline (i.e., sequence of 2-D coordinates) in the texture domain.

In this implementation, paths are not required to partition the mesh 120 into a set of triangular patches. Thus, some patches 122 on the mesh 120 may not have any corresponding texture patches 122 after partition operations. However, as described below, this is simply resolved with a surface texture inpainting process implemented by texture montage 112. This allows a user to utilize any model (3-D mesh 120) and any feature correspondences 118. In one implementation, when no feature correspondences 118 are input or generated, texture montage 112 considers the entire 3-D mesh 110 to be a patch 122.

To generate partition 126, texture montage 112 computes the shortest paths between all pairs of vertices specified in the feature correspondences 118. Texture montage 112 stores the paths in a priority queue ordered by length. Texture montage 112, for each path in the queue, starting with the shortest path (i.e. the first on the queue), evaluates the path to determine whether both ends of the path have corresponding texture coordinates in the same image 116. If so, the path is determined to be a valid path-curve pair. The path-curve pair is then added to the correspondence set. In this implementation, a same pair can be stored twice, one for each direction of the path.

Texture montage 112 performs these partitioning operations to derive an ab-initio partition of the mesh 120. This is in contrast to conventional systems, which start with a pre-cut mesh. Additionally, texture montage 112 does not make a priori assumptions on texture content, but instead utilizes multiple images 116 to define texture without enforcing any constraint on the number of feature correspondences 118. Therefore, some path-curve pairs in texture patches 122 may cross background regions, possibly resulting in an undesirable partition. To address this, texture montage 112 utilizes the pre-computed distance for each pixel in an image 116 to evaluate the validity of the image paths.

In this implementation, texture montage 112 computes the average distance between an image path and the foreground region in the image 116. If the distance of an edge in the image path is less (or more) than a given threshold number of pixels, the edge is valid (or inversely, invalid). Texture montage 112 uniformly distributes sampling points along the image paths such that the distance between successive sampling points is less than one pixel. Texture montage 112 computes the distance for each sampling by interpolating the pre-computed distance function on the image 116, which was determined during the image pre-processing stage. Image curve distance is computed as the average of the distances of all sampling points.

Exemplary Progressive Mesh Creation

Texture montage 112 implements half-edge collapse simplification operations to build progressive mesh 128 based on the path-curve pairs sets in the partition 126. Feature vertices are retained and edge collapse sequences are constrained to preserve the topology of both the path network and of the original 3-D mesh 120. The result of this simplification is a "base mesh", wherein each edge corresponds to a path on the original mesh 120. Texture montage 112, for each triangle of the base mesh that corresponds to a texture triangle in an image 116, maps the triangle into that image 116 by setting the corresponding texture coordinates for its three vertices. The resulting chart is parameterized over its corresponding image plane, as described below. Texture montage 112 flags triangles with no corresponding texture triangles as empty. Empty triangles will be filled with texture later, as described below. Because an edge may be prevented from collapsing to preserve topology, the base mesh may contain vertices that are not feature vertices. Such vertices are initially flagged as empty.

For each vertex that is deleted during half-edge collapse operations, texture montage 112 computes the vertex's relative position with respect to its neighbors. For example, suppose that $\{v_i, v_j\}$ is the edge selected for collapse, and $v_i$ is the vertex chosen to be deleted. First, the one-ring neighbors of $v_i$ before collapse are flattened over the 2-D plane using discrete conformal mapping. Texture montage 112 then computes the generalized barycentric coordinates of $v_i$ with respect to its one-ring neighbors in the 2-D plane. However, if the vertex $v_i$ is on one of the matching paths and described above, texture montage 112 splits the one-ring of $v_i$ into two sub-polygons, separated by the path. At this point, texture montage 112 computes the barycentric coordinates of $v_i$ with respect to the left and right sub-polygons. Texture montage 112 utilizes this left side and right side relative location information to construct a coarse-to-fine map.

Exemplary Coarse-to-Fine Map Construction

Given the partial, coarse texture coordinate assignments on the progressive mesh 128, texture montage 112 derives texture coordinates for all the vertices of the original mesh 120, or at least for those for which an unambiguous texture assignment can be determined. (Texture montage 112 handles vertices for which an unambiguous texture assignment is not determined as described below in the section titled "Surface Texture in Painting"). During this coarse-to-fine map construction process, texture montage 112 reinserts the vertices, one at a time back into the base mesh, in the reverse order of the previous edge collapse operations. Texture montage 112 optimizes texture coordinates by moving the inserted vertex around within the region formed by its one-ring neighbors in the texture domain, before optimizing each of its one-ring neighbors in the same manner. The initial texture coordinates of the inserted vertex are computed using the barycentric coordinates stored during the half-edge collapse simplification. The (u, v) texture coordinates assigned to the inserted vertex are obtained through iterative random line search, as now described in the following section.

Exemplary Texture Coordinates Optimization

Based on the mesh partitioning and simplification operations, vertices are divided into three categories. The first category includes feature vertices. Feature vertices are fixed in the texture domain to satisfy the constraints specified by a user. The second category of vertices includes inner vertices of synthesized patches 122 as well as vertices on the boundary between patches 122 that are mapped onto the same image 116. Vertices in this second category have all of their neighboring triangles mapped into the same image 116. The third category of vertices includes vertices on the boundary between patches 122 that are mapped into different images 116. Texture montage 112, at this stage, does not process vertices inside regions flagged as empty. Such vertices are processed later, as described below in reference to inpainting operations. Vertices on the boundary between empty and non-empty regions are treated as in the second category.

Texture montage 112 processes first category vertices during progressive mesh 128 (base mesh) constructions. For each vertex $v_i$ belonging to the second category, suppose the vertex is reinserted (i.e., split) from $v_j$. If the neighboring triangles of $v_j$ are empty, texture coordinates for $v_i$ are not computed, and the newly introduced triangles are set as empty. Otherwise, texture montage 112 maps the neighboring triangles of $v_j$ into the same image 116, so the newly added triangles are mapped into this image 116 and the texture coordinates of $v_i$ are initialized as the linear combination of texture coordinates of its one-ring neighbors in this image 116 using the barycentric coordinates $w_k$ previously computed during the edge collapse phase:

$$\binom{u}{v}(v_i) = \sum_{v_k \in N(v_i)} w_k \binom{u}{v}(v_k), \quad -2 \text{ mm}, \tag{1}$$

where $N(v_i)$ are the 1-ring neighbors of vertex $v_i$.

In a rare occurrence, initial texture coordinates may cause triangle flipping. In such a scenario, texture montage 112 places $v_i$ at the centroid of its neighborhood polygon. From these initial assignments, texture montage 112 optimizes $(u, v)(v_i)$ using the well-known $L^\infty$-based geometric stretch minimization routine. Texture montage 112 also considers the previously described image background restriction by guaranteeing the validity of the parameterization (no flipped triangles in texture space) while staying within the one-ring. More particularly, the optimization process performs a binary search in a random direction for optimal coordinates. Assignments to the background regions in the texture image 116 are rejected.

Exemplary Texture Coordinate Optimization along Boundaries

Figure 4:
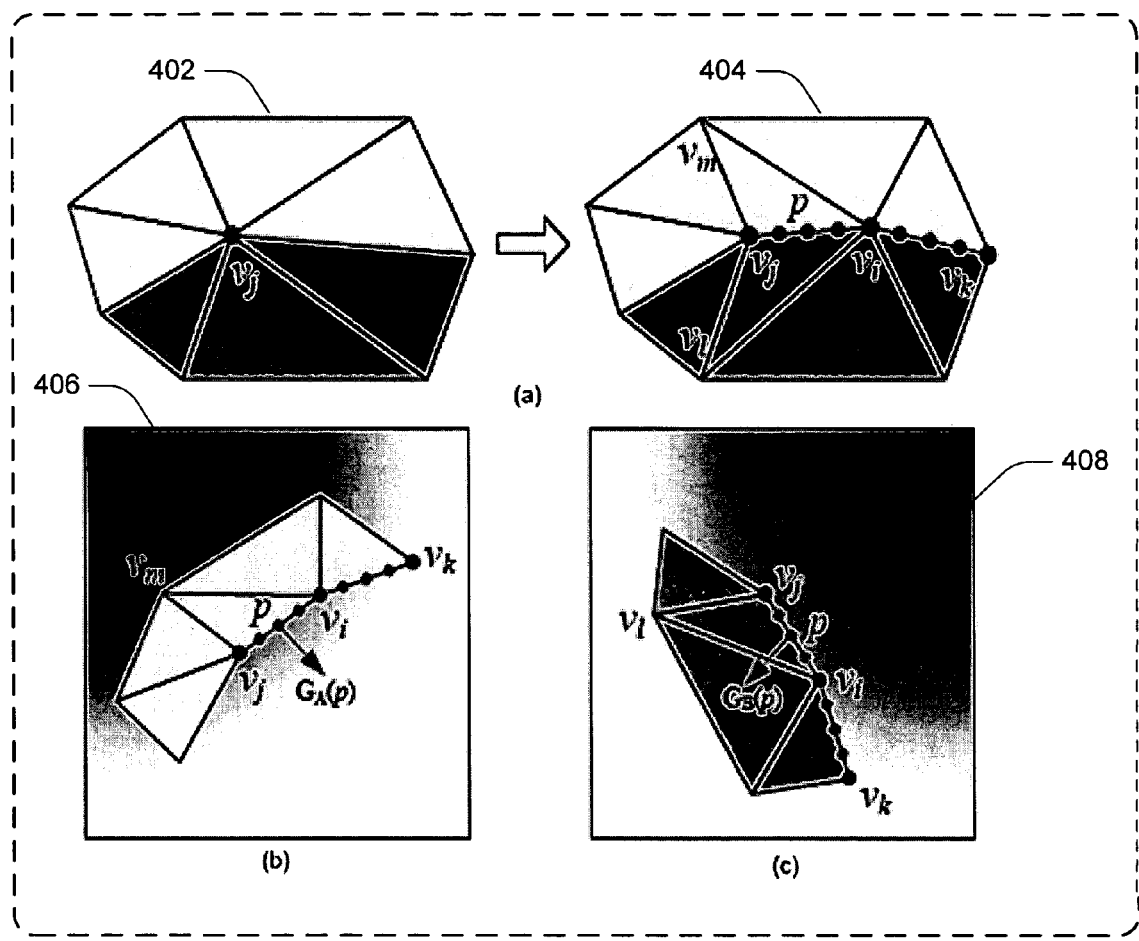
FIG. 4 shows exemplary triangles for texture montage boundary vertex split and optimization operations.

FIG. 4 shows exemplary triangles for boundary vertex split and optimization operations. More particularly, FIG. 4(a) shows that the vertex $v_i$ in 404 is reinserted from $v_j$ in 402; triangles in lighter gray are mapped onto image $I_1$, as shown in 406(b). Triangles in darker gray are mapped into image $I_2$, as shown in 408(c). The dots along $\{v_i, v_j\}$ and $\{v_i, v_k\}$ in image 404 show exemplary sampling points used to compute texture mismatch energy. The arrows in 406(b) and 408(c) indicate the image color gradients at sampling point p. Texture montage 112 maps each vertex of the third vertices category into two images 116. Therefore, during optimization, operations of texture montage 112 consider not only the geometric distortion of the parameterization but also the texture mismatch along a patch 122. Exemplary techniques to initialize and optimize the texture coordinates for these particular vertices are now described.

Referring to FIG. 4, when a vertex $v_i$ belonging to a boundary of a patch 122 is reinserted, vertex $v_i$ will appear in two images $I_1$ and $I_2$. The newly added triangle $\{v_i, v_m, v_j\}$ is mapped to $I_1$ and $\{v_i, v_j, v_l\}$ is mapped to $I_2$. The initial texture coordinates of $v_i$ in $I_1$ $((u_1, v_1)(v_i))$ are computed by adapting Equation (1) to count only the neighbors mapped into $I_1$ (these one-sided barycentric weights were computed as described above). Texture montage 112 implements similar operations for the texture coordinates $(u_2, v_2)(v_i)$ in $I_2$. Optimization of the vertex $v_i$ in each image, now takes texture mismatch between the two sides of a patch boundary into account.

Figure 5:
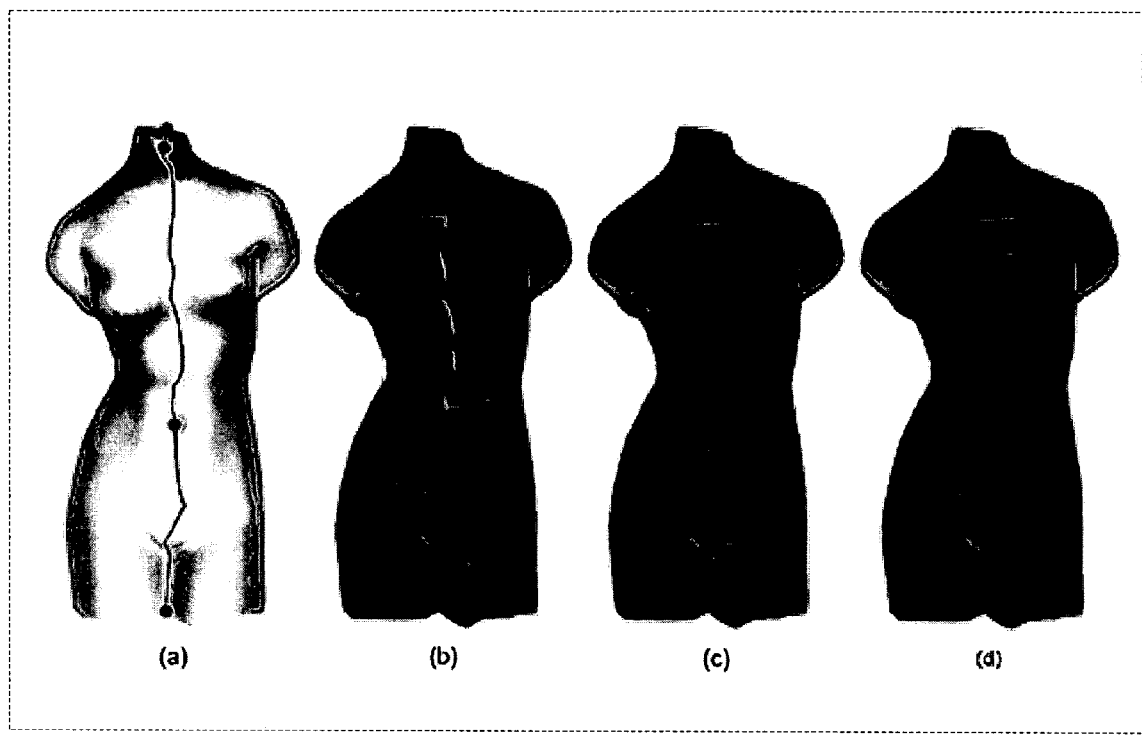
FIG. 5 shows exemplary texture montage content-based optimizations of texture image vertices.

FIG. 5 shows exemplary content-based optimizations of texture image vertices. Referring to FIG. 5, (a) shows a Venus model split in the middle to form two charts (the feature points are marked with dots). FIG. 5(b) illustrates exemplary geometric stretch optimization only, wherein discontinuities appear. FIG. 5(c) illustrates results of exemplary content-based optimization operations implemented by texture montage 112, which offer automatic matching of the texture colors at the boundaries. FIG. 5(d) illustrates that additional smoothness can be achieved with gradient matching operations.

To take texture mismatch between two sides of a texture patch boundary into account, texture montage 112 mixes both geometric and texture constraints using a weighted energy mix based on the following equation:

$$E_{boundary} = \lambda E_{geo} + (1-\lambda) E_{tex}, \tag{2}$$

wherein $E_{geo}$ is the $L^\infty$-based geometric distortion measure, and $E_{tex}$ is a measure of the mismatch between the two texture images' content along the shared boundary, as discussed below in the section titled "Evaluating Texture Mismatch Energy."

In practice, texture montage 112 uniformly distributes a set of points $\{s_k\}$, $1 \leq k \leq n$, along the shared edges $\{v_i, v_j\}$ and $\{v_i, v_k\}$ as shown in FIG. 4. In view of this, texture montage 112 computes $E_{tex}$ as the sum of squared differences of the contents of image $I_1$ and $I_2$ (images 116) at these sampling points according to the following equation.

$$E_{tex} = \sum_{k=1}^{n} \|I_1(s_k) - I_2(s_k)\|_{LUV}, \tag{3}$$

wherein $I_k(s)$ indicates the color of point s in image $I_k$, for a perceptually-based LUV metric of the color space. Note that added control is provided with additional measures, as described below.

Because a sampling point may not be located at integer pixel positions, texture montage 112 implements a bilinear interpolation of the image 116. The number of sampling points is determined based on the resolutions of the images 116 such that the distance between two successive points is less than half of the size of a pixel in both images 116.

Texture montage 112 minimizes the nonlinear function $E_{boundary}$ by implementing random line searches alternately on $(u_1, v_1)$ and $(u_2, v_2)$ as follows. Texture montage 112 fixes $(u_2, v_2)(v_i)$, and performs a random line search for $(u_1, v_1)(v_i)$ to improve $E_{boundary}$; updates are made to $I_1(s_i)$ and $L^\infty(t)$ for $t \in I_1$; $(u_1, v_1)(v_i)$ is fixed, and random line searches for $(u_2, v_2)(v_i)$ are performed to improve $E_{boundary}$; and, updates are made with respect to $I_2(s_i)$ and $L^\infty(t)$ for $t \in I_2$. This is repeated until $E_{boundary}$ cannot be further decreased. In one implementation, thirty (30) such iterations are sufficient to obtain satisfactory visual results. In this implementation, $E_{tex}$ is normalized to be within $[0,1]$ and the weighting parameter $\lambda$ is set to 0.1.

Evaluating Texture Mismatch Energy $E_{tex}$

Texture mapping typically tries to map multiple photos of a single object to a 3-D model by minimizing color mismatches across patch boundaries. The simplest mismatch measure $E_{tex}$ is the sum of differences of image colors. However, in conventional applications where users want to compose features from photos of different objects over the same surface, color matching is simply not enough. More sophisticated image contents such as color gradient, is not, but should be considered.

For instance, system 100 determines texture mismatch energy $E_{tex}$ as a combination of colors and their gradients:

$$E_{tex} = \sum_{k=1}^{n} (\alpha \|I_1(s_k) - I_2(s_k)\| + (1-\alpha) \|G'_1(s_k) - G'_2(s_k)\|), \tag{4}$$

wherein the weighting parameter $\alpha$ allows a user to get a proper balance between color matching and gradient matching. $I_1(s)$ and $I_2(s)$ are the colors of image $I_1$ and $I_2$ (images 116) at s respectively; $G_1'(s)$ and $G_2'(s)$ are the color gradients transformed to the tangent space on the mesh 120:

note that they are different from the original color gradients $G_1(s)$ and $G_2(s)$ of the images. (For purposes of exemplary illustration, texture mismatch energy, transformed color gradients, etc., are represented by respective portions of "other data" 124). Texture montage 112 computes the transformed color gradients as follows: suppose that s is located on the edge $\{v_i, v_j\}$ (e.g., see FIG. 4). Two surface triangles ($\{v_i, v_m, v_j\}$ and $\{v_i, v_j, v_l\}$) that share the common edge $\{v_i, v_j\}$ are flattened with a hinge map. The texture triangle in image $I_1$ corresponding to $\{v_i, v_m, v_j\}$, and the rotated triangle, define an affine mapping $\psi_{\{v_i, v_m, v_j\}}$ from image $I_1$ to the plane. $G_1'(s)$ is then computed as $\psi_{\{v_i, v_m, v_j\}}(G_1(p))$. Similarly, $G_2'(p)$ is computed as $\psi_{\{v_i, v_m, v_j\}}(G_2(p))$. The reason for not using the original color gradient is that $E_{tex}$ should measure the texture mismatch on the 3-D surface, instead of measuring such mismatch in the images. This is because the orientation and scale of images is potentially very different (see FIG. 4) from that of the 3-D surface.

To minimize gradient mismatch, texture montage 112 moves texture coordinates of the immediate neighbor vertices inside the boundaries of adjacent patches 122, as well as those of boundary vertices (since they will affect the affine mapping $\psi$ in gradient computation). FIG. 5(d) shows exemplary mapping result with gradient mismatch energy.

Surface Texture Inpainting

Figure 6:
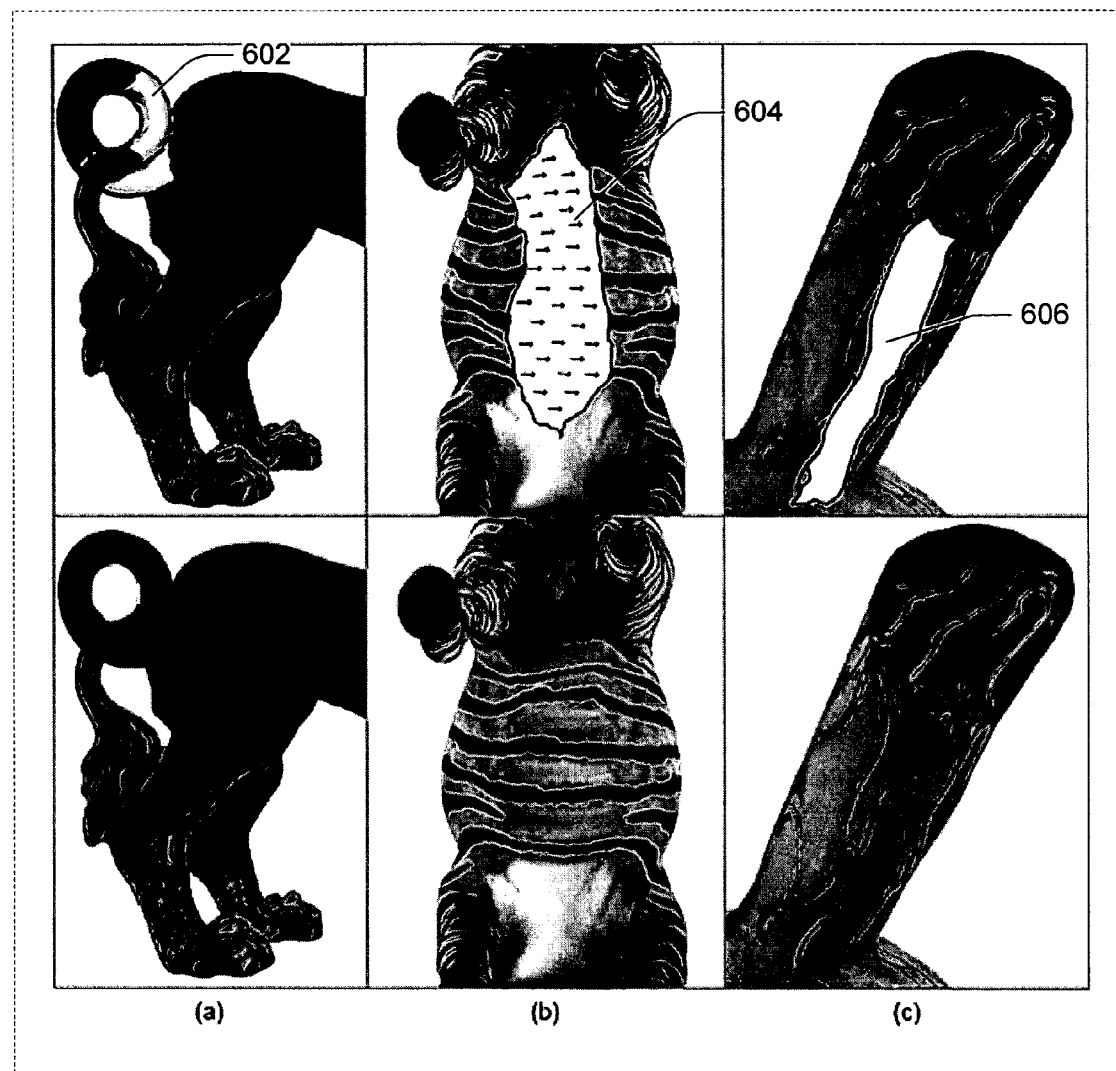
FIG. 6 shows exemplary illustrations of texture montage surface texture inpainting of hole-regions utilizing simple interpolation.

Feature correspondences 118 (constraints) defined by a user may not be sufficient to assign textures on the whole surface of 3-D mesh 120. Thus, texture "holes", or "hole-regions" may exist. A hole-region has no defined/associated texture yet, but texture surrounds the hole-region. FIG. 6 shows exemplary such hole-regions 602 through 606. If the user does not wish to impose more constraints with more texture images 116 to fill in these holes, texture montage 112 will automatically fill in the holes with surface texture inpainting operations. These operations fill the holes with texture colors on triangular meshes 120 using Poisson-based interpolation. PDE-based inpainting approaches are effective for images. The Poisson equation for a function $f$ with Dirichlet boundary condition is expressed as follows:

$$\Delta f = d \text{ over } \Omega, \text{ with } f|_{\partial\Omega} = f^*|_{\partial\Omega},$$

wherein $\Delta$ is the Laplace operator and d is a scalar field (e.g., the divergence of a guidance vector field v). $\Omega$ is a closed region of an arbitrary domain (e.g., a flat image or a non-flat mesh) with boundary $\partial\Omega$. The function $f^*$ is a known scalar function, while $f$ is the unknown scalar function defined over $\Omega$ that can be uniquely determined by solving this Poisson equation.

Since the Laplacian is a linear differential operator, the Poisson equation can be discretized into a sparse linear system that can be solved efficiently for any discrete domain $\Omega$. In this implementation, texture montage 112 utilizes the well-known cotangent formula for discrete meshes.

Texture montage 112 implements surface texture inpainting by setting $f^*$ to be the color around the hole resulting from the above described texture mapping process. The function $f$ represents the vertex colors in the hole-regions for which a solution is to be determined. The Poisson equation on a mesh solves only for colors at vertices. To store the hole texture on the mesh 120 temporarily for the computation, texture montage module uniformly subdivides the triangles in the hole-regions so that the mesh resolution matches resolution of image 116. Newly inserted vertices are placed onto the original piecewise linear mesh 120, so the shape of the original mesh is unchanged. This subdivision also provides for solution of the Poisson equation with a multigrid solver. The resulting refined mesh (a respective portion of "other data" 124) is used for inpainting operations and subsequent texture atlas (texture patches 122) generation. In this implementation, the refined mesh is discarded once the inpainting operations are complete.

Texture montage 112 respectively implements simple interpolation, user-guided inpainting, and/or surface cloning effects, by varying the value of d in the Poisson equation.

Simple Interpolation

Setting d to a value of zero (0) results in a harmonic interpolant. However, such a color interpolation is rarely sufficient for complex textures. Texture montage 112 implements a substantially better blending scheme by deriving an appropriate field d from the boundaries of the hole-region. For purposes of exemplary illustration, boundaries of a hole-region are represented by respective portion of "other data" 124. Texture montage 112 sub-divides immediate neighboring faces outside the boundary of the hole, and sets boundary values of d as the Laplacian of the color vector (RGB) mapped on the refined mesh evaluated at the closest outer (refined) vertex to a boundary vertex. Texture montage 112 then interpolates d at inner vertices using Gaussian radial basis functions (RBF), where the distance used is the usual Dijkstra's distance. Both interpolants can be computed interactively and work well for most simple, small regions.

FIG. 6 shows exemplary illustrations of surface texture inpainting of hole-regions utilizing simple interpolation. In particular, FIG. 6(a) shows an exemplary simple interpolation of hole-region 602 for a tail of a feline; FIG. 6(b) shows an exemplary simple interpolation of hole-region 604 for user guided inpainting of an abdomen of a horse; FIG. 6(c) shows an exemplary simple interpolation of hole-region 606 for seamless cloning of the ear of a bunny (e.g., see FIG. 2).

User-Guided Inpainting

For hole-regions surrounded by textures with salient patterns, texture montage 112 allows a user to specify vectors at vertices in the hole-region. These vectors serve as texture blending "strokes". Texture montage 112, using RBF interpolation, automatically computes a non-vanishing vector field at every such user-specified vertex. For purposes of exemplary illustration, such user-specified vectors and non-vanishing vector fields are represented with respective portions of "other data" 124. Texture montage 112, after computing the boundary values of d (as described above), assigns the value of d at a given inside vertex as follows. The flow line is traced forward and backward from the given inside vertex. Two boundary values (one at each end of the flow line) are identified, and texture montage 112 sets the value of d to the weighted average of the d values at the two end vertices, where the weight is based on the distances along the flow line to the two boundary intersections. In this manner, texture montage 112 seamlessly stitches texture patterns from all around patch boundaries as demonstrated, for example, in FIG. 6(b).

Seamless Cloning

Texture montage 112 implements seamless cloning to texture non-textured holes and/or for any other mesh region. A user specifies a source region in an arbitrary image 116 (a user-specified image 116) and the associated target region on a surface (3-D mesh 120). For purposes of exemplary illustration, such user-specified source and target regions and all other data associated with seamless cloning operations are represented with respective portions of "other data" 124. For non-textured holes, d is set to the Laplacian of the color values of a chosen image 116. Texture montage 112 initializes the source region with d using RBF-based operations (described above with respect to "Simple Interpolation"). Texture montage 112 then replaces the values of d in the target region(s) on the mesh 120 covered by the user-specified image 116 by using the Laplacian of the color mapped onto the mesh. By fixing the colors of the vertices that are not covered by the user-specified image 116 as a boundary condition, texture montage 112 solves the Poisson equation to get the new colors for vertices in the target region.

In one implementation, texture montage 112 provides a user with a preview of the cloning results by directly projecting the source texture region of the user-selected image 116 onto the surface of the target region in the 3-D mesh 120. Although such previewed texture is not yet integrated with the surrounding surface areas, this feature provides a user with useful visual feedback prior to the seamless integration operations.

FIG. 6(c) shows exemplary results of a cloning operation on a bunny's ear.

In one implementation, texture montage 112 utilizes the Poisson equation to smooth any color discontinuity along boundaries of patches 122. To this end, texture montage 112 calculates the mean color between patches 122 of each seam once textured on the object (3-D mesh 120), and utilizes the Poisson equation to adjust the intensity of texture color in texture space according to the mean color. These post-processing operations efficiently suppress any residual color mismatch between different texture images 115.

Figure 7:
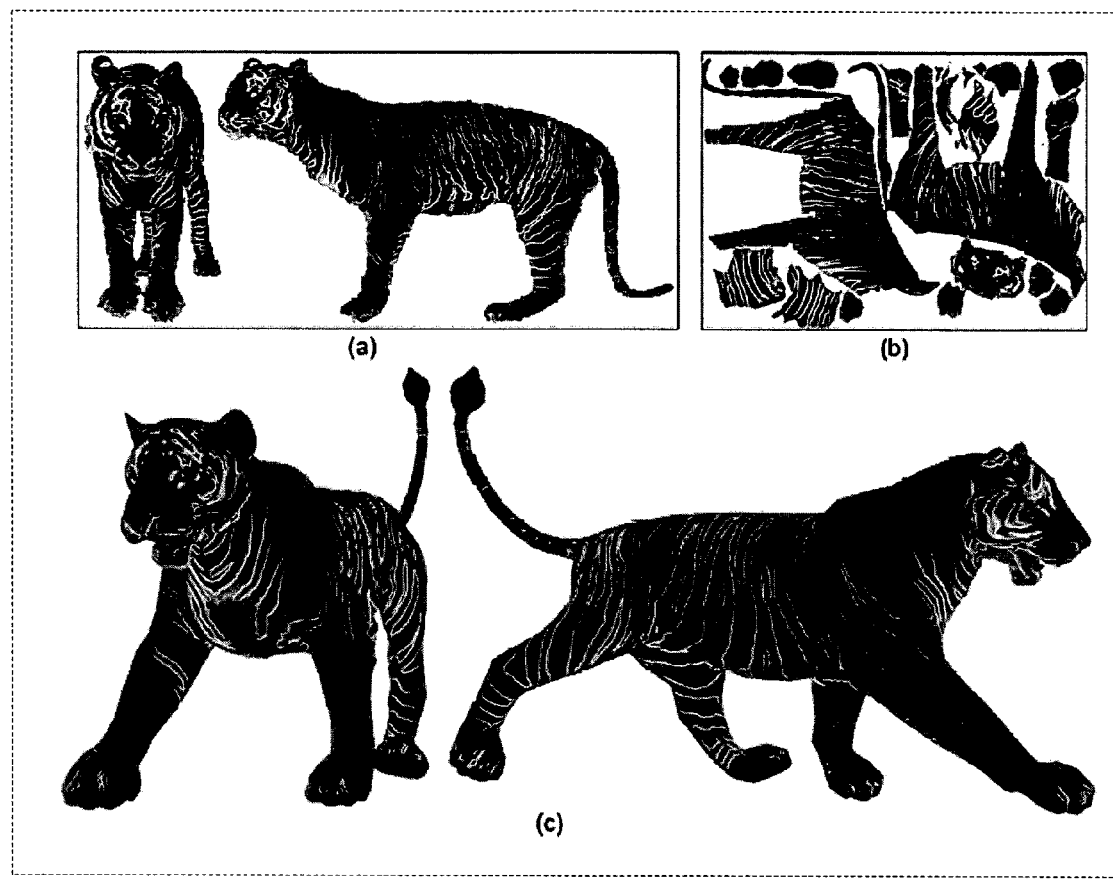
FIG. 7 shows an exemplary illustration demonstrating that texture montage can utilize images of an object, such as an animal, and apply textures associated with the object onto a 3-D model of a different object.

FIG. 7 shows an exemplary illustration demonstrating that texture montage 112 can utilize, for example, images 116 of an animal, and apply its "fur" directly onto a 3-D model 120. More particularly, FIG. 7 shows how texture montage 112 textures a lioness model from images of a tiger. FIG. 7(a) shows exemplary input images 116. FIG. 7(b) shows exemplary contents of a generated texture atlas (texture patches 122). FIG. 7(c) shows exemplary mapping results given the input images of FIG. 7(a) and the texture atlas of FIG. 7(b).

An Exemplary Procedure for Texture Montage

Figure 8:
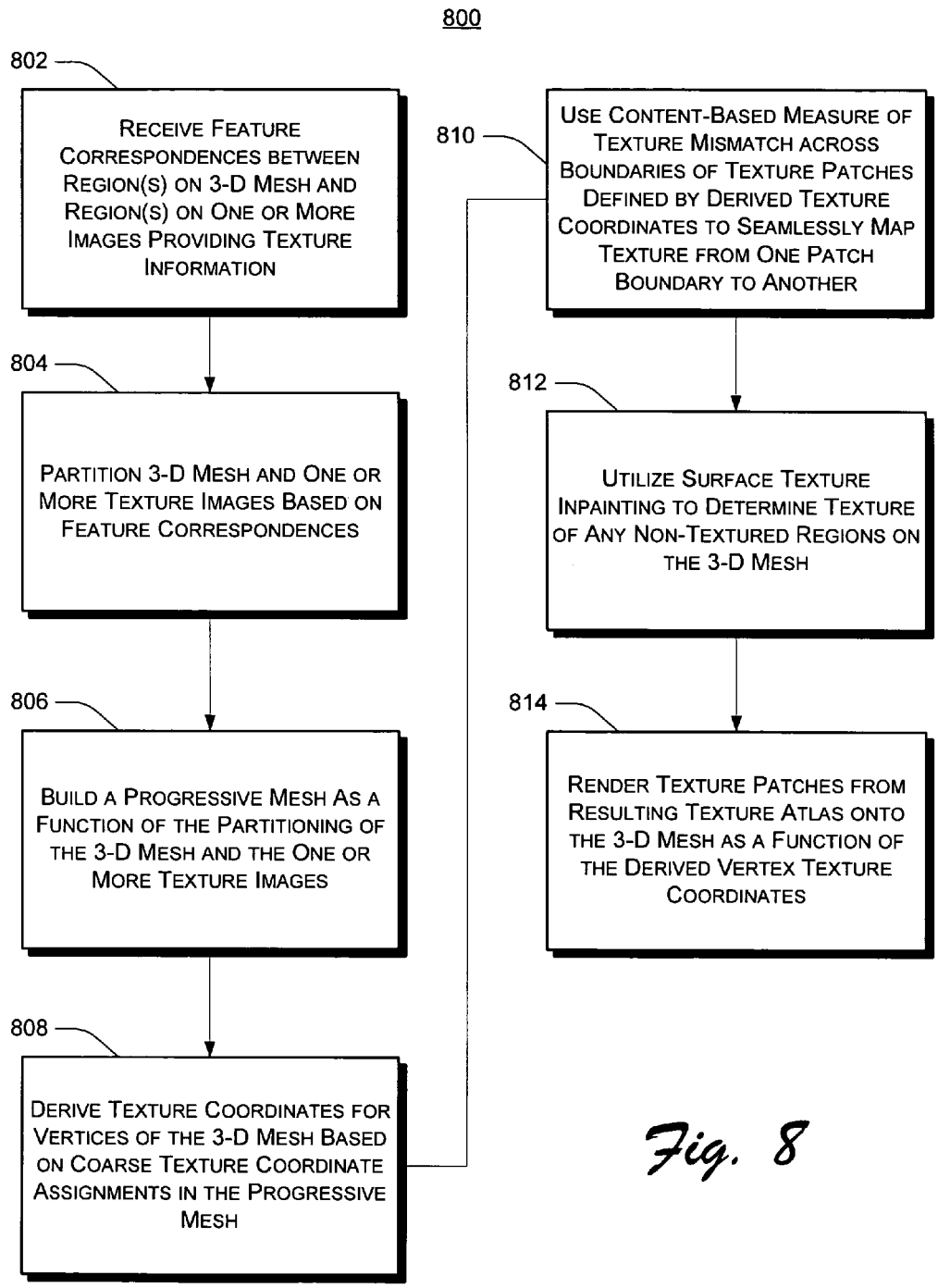
FIG. 8 shows an exemplary procedure for texture montage.

FIG. 8 shows an exemplary procedure for texture montage. For purposes of discussion and exemplary illustration, operations of this procedure are described with respect to components of FIG. 1. The left-most digit of a component reference number identifies the particular figure in which the component first appears. At block 802, texture montage 112 receives an arbitrarily sized set of feature correspondences 118 between user-defined region(s) on 3-D mesh 120 and region(s) on one or more images 116 providing texture information. At block 804, texture montage 112 partitions 3-D mesh 120 and the one or more images 116 using the received feature correspondences 118. These operations create a partition of the 3-D mesh 120 and the one or more images 116 (i.e., partition 126). At block 806, in view path-curve pairs in partition 126, texture montage 112 builds a progressive mesh 128 with coarse texture coordinate assignments. At block 808, texture montage 112 derives texture coordinates for vertices of the 3-D mesh 120 based on coarse texture coordinate assignments in the progressive mesh 128. That is, the operations of block 808 implement coarse-to-fine map construction operations, which result in derived vertex texture coordinates 130. Derived vertex texture coordinates 130 define a set of texture patches in multiple images. All these texture patches are collected and packed into a unified texture atlas.

At block 810, texture montage 112 implements a content-based measure of texture mismatch across boundaries of texture patches 122 to seamlessly map texture from one patch boundary to an adjacent patch boundary. At block 812, texture montage 112 implements surface texture inpainting to texture any non-textured hole-regions on the 3-D mesh 120. If there are any such hole-regions, these inpainting operations result in additional texture patches 122. Collectively, texture patches 122 provide a texture atlas. At block 814, texture montage 112 renders texture patches from the texture atlas onto to the 3-D mesh 120 as a function of the derived vertex texture coordinates 130.

CONCLUSION

Although the systems and methods for texture montage have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:
1. A computer-implemented method comprising:
   receiving feature correspondences that map at least one region on a 3-D mesh to at least one region on an image of one or more images, each of the one or more images providing texture information;
   creating an atlas of texture patches as a function of the feature correspondences; and
   wherein the atlas of texture patches provides a set of texture patches that can be rendered onto the 3-D mesh.
2. A method of claim 1, wherein the feature correspondences are input by a user.
3. A method of claim 1, further comprising seamlessly rendering the atlas of texture patches on to the 3-D mesh.
4. A method of claim 1, wherein creating the atlas of texture patches further comprises:
   determining that subsequent to creating the atlas of texture patches, there are one or more hole-regions of the 3-D mesh without a corresponding texture patch;
   for each hole-region, generating one or more corresponding texture patches for the hole-region that comprise texture that smoothly blends-in with any texture surrounding the hole-region; and
   adding the one or more corresponding texture patches to the atlas of texture patches.
5. A method of claim 4, wherein generating the corresponding texture patches is automatic.
6. A method of claim 4, wherein generating the corresponding texture patches is user guided to seamlessly clone texture from at least one different region on the 3-D mesh to the region.
7. A method of claim 4, wherein generating the corresponding texture further comprises implementing surface texture inpainting operations to generate the corresponding texture.
8. A method of claim 1, wherein creating the atlas of texture patches further comprises:
   partitioning the 3-D mesh and one or more of the images based on the feature correspondences;
   creating a progressive mesh that preserves boundaries resulting from the partitioning of the 3-D mesh and the one or more images;
   deriving texture coordinates for vertices of the 3-D mesh based on coarse texture coordinate assignments in the progressive mesh; and mapping texture across adjacent patch boundaries, the patch boundaries being identified from derived texture coordinates.

9. A method of claim 8, wherein creating the progressive mesh further comprises implementing repeated half-edge collapses to create the progressive mesh.

10. A method of claim 8, wherein deriving the texture coordinates for vertices of the 3-D mesh further comprises:
identifying the texture coordinates based on a content-based major of texture mismatch across patch boundaries; and
determining the texture coordinates based on an interleaved texture-coordinate optimization that minimizes texture mismatch while optimizing geometric distortion.

11. A computer-implemented method comprising:
partitioning a 3-D mesh and one or more texture images based on an arbitrarily sized set of user-specified feature correspondences;
creating a base mesh and a coarse texture map based on results of the partitioning, each edge in the base mesh corresponding to a path on the 3-D mesh;
deriving texture coordinates for vertices of the 3-D mesh based on partial texture coordinate assignments on the base mesh;
optimizing the texture coordinates; and
generating a set of texture patches from optimized texture coordinates, the texture patches for seamlessly texturing surface of the 3-D mesh with texture provided by at least a subset of the one or more texture images.

12. A method of claim 11, wherein optimizing the texture coordinates is a function of one or more of vertices locations, associated texture images, and a background restriction.

13. A method of claim 11, wherein optimizing the texture coordinates further comprises optimizing texture coordinates along texture patch boundaries based on texture mismatch and mapping distortion between sides of a patch boundary.

14. A method of claim 11, wherein the feature correspondences specify features along contours of the 3-D mesh and the one or more texture images such that if a particular feature on the 3-D mesh appears across multiple texture images, the particular feature is specified across each of the multiple texture images.

15. A method of claim 14, wherein the features are any combination of polygons and lines.

16. A method of claim 11, wherein partitioning the 3-D mesh further comprises:
mesh-to-texture matching by:
computing shortest paths between all pairs of feature vertices;
testing each path of the shortest paths to determine if it is a valid path-curve pair, a valid path-curve pair having texture coordinates of both ends of the path in a same texture image;
for each valid path-curve pair, adding the path-curve pair to the feature correspondences.

17. A method of claim 1, further comprising:
determining that the feature correspondences are too sparse to map a texture from the one or more texture images to one or more portions of the 3-D mesh;
responsive to the determining, surface texture inpainting using Poisson-based interpolation to define texture for the one or more portions; and
adding the texture to the set of texture patches.

18. A method of claim 17, wherein the surface texture inpainting is based on simple interpolation, user-guided inpainting, or user-guided seamless cloning.

19. A method of claim 18, wherein the simple interpolation derives a scalar field of the Poisson-based interpolation from boundaries of the one or more portions.

20. A method of claim 18, wherein the user-guided inpainting utilizes vectors specified at vertices associated with an area of the one or more portions, and wherein the method further comprises:
automatically generating a non-vanishing vector field at each of the vertices using interpolation;
deriving a scalar field of the Poisson-based interpolation from boundaries of the area;
assigning a value to the scalar value for a vertex inside the area by:
tracing a flow line forward and backward to the vertex that provides boundary values; and
determining a weighted average of the boundary values.

* * * * *